United States Patent
Gohman et al.

(10) Patent No.: US 7,768,715 B2
(45) Date of Patent: Aug. 3, 2010

(54) WHOLE SYSTEM ZOOM AND VARIFOCAL LENS WITH INTERMEDIATE IMAGE

(75) Inventors: Jeffrey A. Gohman, Hillsboro, OR (US); Mark D. Peterson, Lake Oswego, OR (US)

(73) Assignee: Theia Technologies, LLC, Wilsonville, OR (US)

( * ) Notice: Subject to any disclaimer, the term of this patent is extended or adjusted under 35 U.S.C. 154(b) by 350 days.

(21) Appl. No.: 12/035,381

(22) Filed: Feb. 21, 2008

(65) Prior Publication Data

US 2008/0198451 A1 Aug. 21, 2008

Related U.S. Application Data

(60) Provisional application No. 60/890,970, filed on Feb. 21, 2007.

(51) Int. Cl.
*G02B 15/14* (2006.01)
*G02B 9/34* (2006.01)
*G02B 9/12* (2006.01)
*G02B 23/14* (2006.01)

(52) U.S. Cl. .................. 359/676; 359/686; 359/689; 359/771; 359/784; 359/683; 359/432

(58) Field of Classification Search ............. 359/432, 359/676, 683, 686, 689, 771, 784
See application file for complete search history.

(56) References Cited

U.S. PATENT DOCUMENTS

| 6,961,188 | B2 | 11/2005 | Betensky et al. |
|---|---|---|---|
| 7,009,765 | B2 | 3/2006 | Gohman |
| 7,012,759 | B2 | 3/2006 | Betensky et al. |
| 7,175,287 | B2 | 2/2007 | Gohman |
| 7,224,535 | B2 | 5/2007 | Neil |
| 7,227,682 | B2 | 6/2007 | Caldwell et al. |
| 7,283,309 | B2 | 10/2007 | Caldwell et al. |
| 2005/0190434 | A1 | 9/2005 | Betensky et al. |
| 2005/0259330 | A1 | 11/2005 | Neil |

FOREIGN PATENT DOCUMENTS

JP 2005-157153 6/2005

*Primary Examiner*—Jack Dinh
(74) *Attorney, Agent, or Firm*—Marger Johnson & McCollom, P.C.

(57) ABSTRACT

A lens system for forming a final image of an object, said system having an object side and an image side and forming a first intermediate real image between the object and final image, said system comprising a moving lens group containing the intermediate real image as the magnification of the final image is changed. The lens system is configured as a whole system so that optical aberrations at the intermediate real image, including field curvature, focus, astigmatism, distortion and color separation, are allowed to be of substantially greater magnitude than the corresponding optical aberrations of the final image.

19 Claims, 7 Drawing Sheets

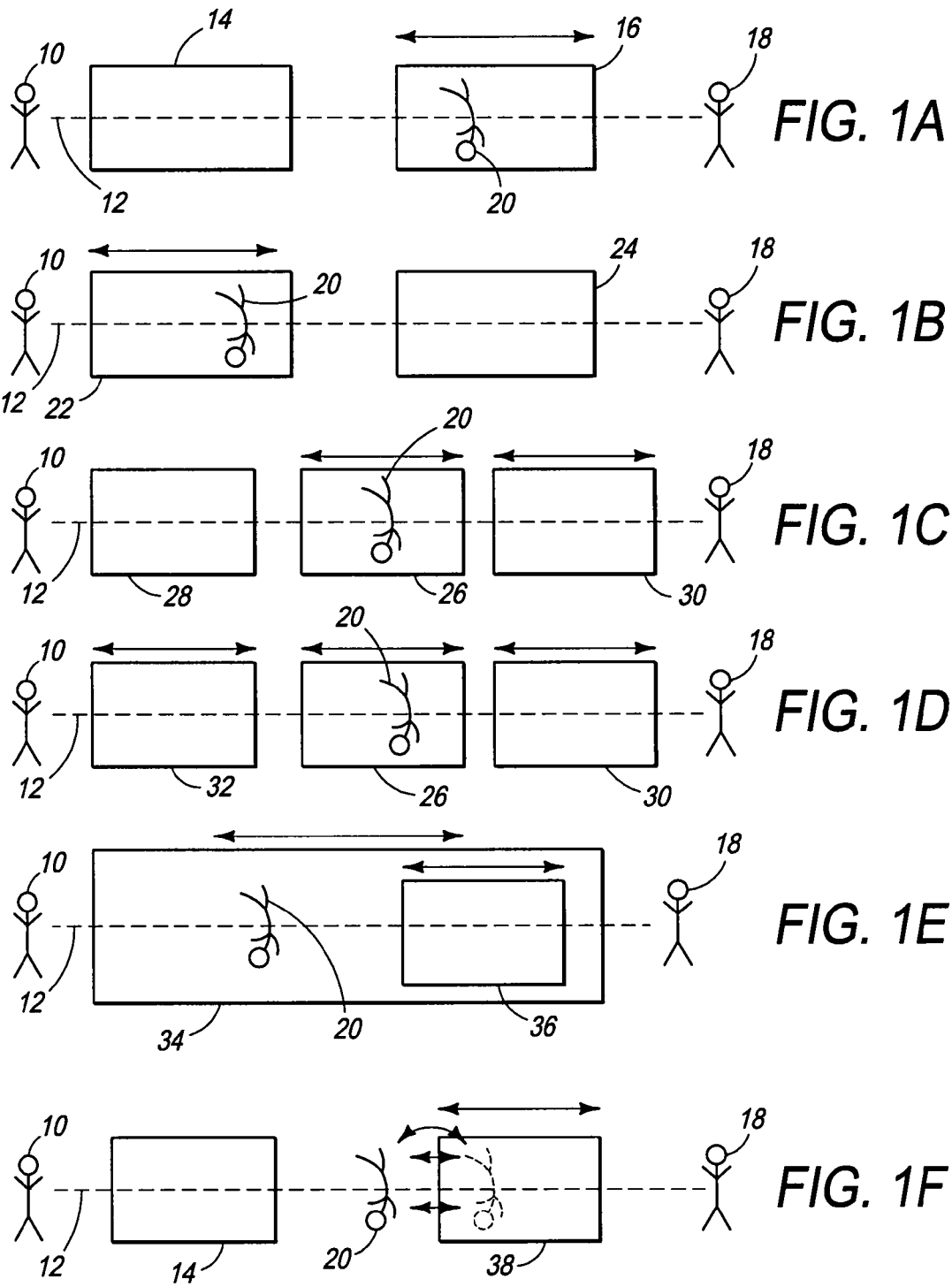

WHOLE SYSTEM ZOOM AND VARIFOCAL LENS WITH INTERMEDIATE IMAGE

CROSS-REFERENCES TO RELATED APPLICATIONS

This application claims the benefit from U.S. Provisional Patent Application No. 60/890,970 filed Feb. 21, 2007 whose contents are incorporated herein for all purposes.

BACKGROUND OF THE INVENTION

1. Field of the Invention

This disclosure relates to optical lenses and more particularly to such lenses that effect intermediate images with simplified optical design while maintaining improved vignetting and performance.

2. Description of the Prior Art

Previous optical lens systems with intermediate images (e.g., U.S. Pat. Nos. 6,961,188, 7,009,765, and others) have been designed with too much emphasis on separating the optical system into two systems; the front group between the object and intermediate image and the rear group between the intermediate image and the final image. This method adds cost and complexity by putting constraints on the designer to correct optical aberrations such as focus, color, and thermal performance in each group separately. Also vignetting and stop position advantages are not fully realized.

Accordingly, the need remains for simplified systems with improved performance and reduced costs.

SUMMARY OF THE INVENTION

The design approach of the present invention treats all lens elements on each side of the intermediate image as part of one whole system. The cost and performance of lenses is improved by allowing large field curvature, focus, astigmatism, distortion and color separation at an intermediate image, then correcting those aberrations at the final image. Likewise, thermal correction is also performed on an intermediate image lens system as a single system. The position of the system stop is selected to improve vignetting and performance but the iris may be located at a different position.

Varifocal and zoom lenses with intermediate images are also improved using these methods and some new varifocal and zoom configurations are disclosed.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIGS. 1A-1F are schematic views of exemplary lens systems implemented according to teachings of the present invention with the real intermediate image moving along an optical axis within or through moving lens groups with respect to a final image plane.

DETAILED DESCRIPTION

Figure 2A:
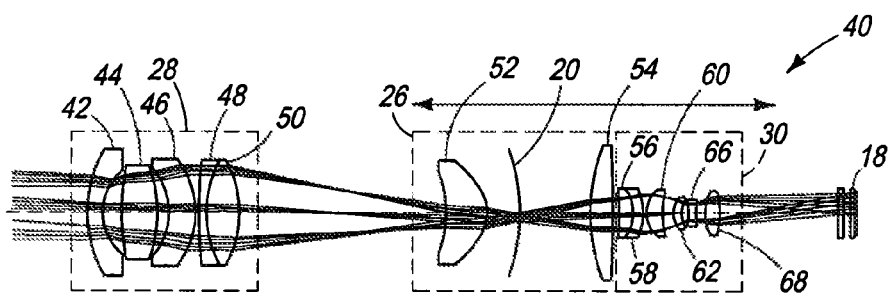
FIGS. 2a-2c illustrates a compound zoom lens shown in three focus positions with an intermediate image effected within a moving lens group per a first embodiment of the invention.

FIGS. 1A through 1F illustrate various configurations of intermediate image lens systems in schematic form. Light from object 10 passes generally along optical axis 12 through a series of lens elements—e.g. front lens group 14 and rear/moving lens group 16—where the light is focused onto an image plane at the back of the lens system to form a final image 18.

The specific lens elements selected for each lens group is based on the performance required, such as zoom, focal length, field of view, and f number. The lens elements selected further result in the formation of an intermediate real image 20 between the object 10 and final image 18. The intermediate real image is a flipped version of the object 10 and, as will be appreciated from a description commencing below, is affected with optical aberrations including field curvature, focus, astigmatism, distortion, and color separation of potentially substantially greater magnitude that the corresponding optical aberrations of the final image 18.

FIG. 1A illustrates an embodiment of the invention where the intermediate image is contained within a (rear) moving lens group 16, the front lens group 14 being stationary (optionally movable). The horizontal arrows with arrowheads on both ends in the upper portions of the figures indicate that each of the moving lens groups (e.g. lens group 16) are movable in both axial directions but in a monotonic manner (i.e. in only one direction when progressing from one extreme to the other of adjustments).

FIG. 1B illustrates an embodiment of the invention where the intermediate image 20 is contained with a (front) moving lens group 22, the rear lens group 24 being stationary (or optionally movable).

FIG. 1C illustrates an embodiment of the invention where the intermediate image 20 is contained within an intermediate moving lens group 26. The lens system of FIG. 1C further includes a front lens group 28, including at least two lens elements, located between the object 10 and the intermediate real image 20, and a rear lens group 30, including at least two lens elements, located between the intermediate real image 20 and the final image 18. The rear lens group 30 is separately moveable along the optical axis 12 from the intermediate lens group 26 to change the magnification of the final image 18.

FIG. 1D illustrates an embodiment of the invention where the intermediate image 20 is contained within an intermediate moving lens group 26 just as in FIG. 1C, except that the front lens group 32 is separately moveable along the optical axis 12 to change the magnification of the final image 18.

FIG. 1E illustrates an embodiment of the invention where the intermediate image is captured within a first moveable lens group 34. A second movable lens group 36 within the first moveable lens group 34, and located rearward of the intermediate real image 20 along the optical axis 12, is additionally moveable from the first moveable lens group 34. This design also contemplates third and fourth movable lens groups (not shown), separate from each other and the second movable lens group 36, that are within and additionally movable from the first moveable lens group 34.

FIG. 1F illustrates an embodiment of the invention where moving lens group 38 moves through the intermediate real image 18 as the magnification of the final image 18 is changed.

Some existing zoom lens designs describe their lenses as containing a front zoom section with sub-groups, an intermediate image, and a rear zoom section with sub-groups. The whole system designed lenses described here do not split the lens system into a front zoom section and a rear zoom section. Some lens systems do not have sub-groups in either the front or rear of the intermediate image. Some have a single subgroup that exists on both sides of the intermediate image and some have a group that moves through the intermediate image while zooming. Also current zoom lenses do not describe varifocal configurations.

The new design type treats all lens elements on each side of the intermediate image as part of one whole system. The cost and performance of intermediate image lens systems is improved by allowing large field curvature, focus, astigmatism, distortion, and color separation at an intermediate image and then correcting those aberrations at the final image. Likewise, thermal correction is also performed on an intermediate image lens system as a single system. The position of the system stop is selected to improve vignetting and performance but the iris may be located at a different position.

Varifocal and zoom lenses with intermediate images are also improved using these methods. New varifocal and zoom lens configurations have been invented that utilize the whole system design methods described above. These configurations differ from current zoom lens designs with intermediate images by the use of the whole system design methods with the emphasis on the final image and allowing the intermediate image to have poor performance.

The intermediate real image 18 is allowed to move as the magnification of the final image is changed by moving a lens group or groups. The intermediate real image 18 is fully contained within a moving group during some (e.g. lens group 38 in FIG. 1F) or all (e.g. lens group 16 in FIG. 1A) of the magnification changes. The intermediate real image can also move through one or more lens elements within the groups.

In a general embodiment, a lens system is comprised of moving and stationary groups of lenses and an intermediate real image between the object and the final image.

Figure 2B:
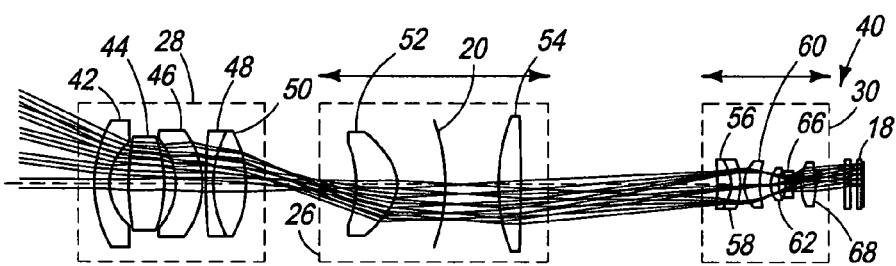
Figure 2C:
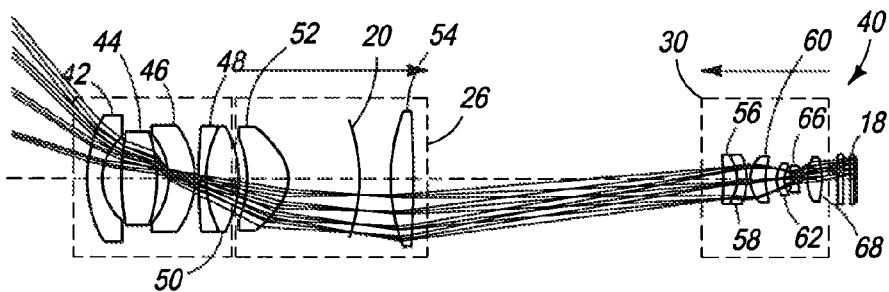

FIG. 2a-2c illustrate a lens system 40 of similar general structure to that shown schematically in FIG. 1C in three zoom positions. Lens system 40 illustrates a 20× zoom lens with performance as shown in Table 1, with the optical prescription of each of the lens elements shown in Table 2.

Stationary front lens group 28 includes a multi-lens structure with three singlets 42, 44, and 46, and a doublet formed of lenses 48 and 50. Front lens group 28 has a negative power. Intermediate moving group 26 is formed of two singlet lenses 52, 54 and captures the intermediate real image 20 between them. The intermediate moving group 26 is also referred to as a field group. It will be appreciated that, because of the whole system design, convergence of field plane points is not a flat plane but rather a curved surface, and generally aspherical in shape due to an allowance of aberrations at the intermediate real image so long as such aberrations can be corrected upon reaching the image plane at the final image 18. A rear lens group 30 moves together and includes a doublet, formed of lenses 56 and 58, and four singlets 60, 62, 64, and 66. Rear lens group 30 is typically a positive power moving group.

While only the lens elements are physically shown in FIGS. 2-6, it is to be understood that conventional mechanical devices and mechanisms are provided for supporting the lens elements and for causing axial movement of the moveable groups in a conventional lens housing or barrel.

TABLE 1

| Lens Performance (FIGS. 2a-2c) | |
| --- | --- |
| Zoom | 20x |
| Groups | 3, 2 move |
| EFL | 2.47-47.5 mm |
| Image Circle | 6 mm |
| F number | 3.5 |
| Field of View | 100.8°-6.9° |
| Distortion | <2% |
| Lateral Color | <.01 mm |
| >50% MTF | 80 lp/mm |

The lens construction and fabrication data for lenses disclosed herein, particularly for lens systems 40, 70, 80, and 90 are set forth in Tables 2, 4, 6, and 8 respectively. The data within the tables is expressed from data extracted from CODE V® optical design software that is commercially available from Optical Research Associates of Pasadena, Calif., U.S.A., which was also used for producing the optical diagrams of FIGS. 2a-2c, 3a-3c, 4a-4c, and 5a-5d and performance plots FIGS. 7a, 7b, 8a, 8b, 9a, and 9b. Throughout this specification, including the Tables, all lens radius (RDY) and thickness (THI) measurements are in millimeters (mm). The first column denotes the lens surface from that closest to the object ('1') to the final image ('31')—left to right in the figures. The lens radius denotes the optical surface radius of curvature for each surface, with a minus sign (−) meaning the center of the radius of curvature is to the left of the surface, as viewed in FIG. 2a, and "Infinity" meaning an optically flat surface. The term "ASP" denotes and aspheric surface with the characteristics K, IC, CUF, and A-D understood by those in the optical arts. The thickness (THI) criteria denotes the axial distance between that surface and the next surface. The RMD characteristic expresses that the lens elements used are refractive (transmissive) and not reflective (e.g. mirrors). The GLA characteristic in the Tables expresses the type of glass used for the lens element.

TABLE 2

Optical Prescription (FIGS. 2a-2c)

| | RDY | THI | RMD | GLA |
|---|---|---|---|---|
| >OBJ: | INFINITY | 1400.000000 | | |
| 1: | 18.88432 | 2.000000 | | SLAH66_OHARA |
| 2: | 7.75455 | 2.823385 | | |
| 3: | 25.99426 | 4.998361 | | LLAH81_OHARA |
| ASP: | | | | |
| K: −2.459394 | | | | |
| IC: YES | CUF: 0.000000 | | | |
| A: −.409744E−04 | B: −.344073E−05 | | | |
| C: 0.101465E−06 | D: −.172313E−08 | | | |
| 4: | −33.97649 | 1.695081 | | |
| ASP: | | | | |
| K: 2.883487 | | | | |
| IC: YES | CUF: 0.000000 | | | |
| A: −.125169E−03 | B: −.280912E−05 | | | |
| C: 0.543996E−07 | D: −.969927E−09 | | | |
| 5: | −9.66063 | 3.866946 | | SLAL8_OHARA |
| 6: | −12.02896 | 0.500000 | | |
| 7: | 103.17049 | 1.000000 | | STIM35_OHARA |
| 8: | 15.16159 | 4.634896 | | SFPL51_OHARA |
| 9: | −15.16159 | 1.000000 | | |
| 10: | −10.63257 | 5.932709 | | SLAL13_OHARA |
| ASP: | | | | |
| K: −17.236145 | | | | |
| IC: YES | CUF: 0.000000 | | | |
| A: −.299517E−03 | B: 0.113039E−04 | | | |
| C: −.264639E−06 | D: 0.256522E−08 | | | |
| 11: | −5.49687 | 4.535214 | | |
| ASP: | | | | |
| K: −1.033420 | | | | |
| IC: YES | CUF: 0.000000 | | | |
| A: 0.401631E−04 | B: 0.000000E+00 | | | |
| C: 0.000000E+00 | D: 0.000000E+00 | | | |
| 12: | 19.92247 | 5.499864 | | |
| 13: | 18.72772 | 4.500673 | | |
| 14: | 26.13597 | 3.131550 | | STIH6_OHARA |
| 15: | −597.96649 | 44.595211 | | |
| 16: | −28.13051 | 2.000000 | | SFPL51_OHARA |
| 17: | −5.29715 | 1.373425 | | SLAH60_OHARA |
| 18: | −8.60980 | 0.500000 | | |
| 19: | 4.70204 | 2.327373 | | SBSM16_OHARA |
| 20: | 19.98879 | 1.000000 | | |
| STO: | INFINITY | 0.500000 | | |
| 22: | 3.78159 | 1.000000 | | SLAH66_OHARA |
| 23: | 3.73681 | 1.121580 | | |
| 24: | −4.02833 | 1.000000 | | STIH53_OHARA |
| 25: | 3.99103 | 1.273248 | | |
| 26: | 7.46834 | 2.218536 | | LLAH81_OHARA |
| ASP: | | | | |
| K: −7.901658 | | | | |
| IC: YES | CUF: 0.000000 | | | |
| A: 0.199221E−02 | B: 0.000000E+00 | | | |
| C: 0.000000E+00 | D: 0.000000E+00 | | | |
| 27: | −8.47590 | 2.271948 | | |
| ASP: | | | | |
| K: −3.629684 | | | | |
| IC: YES | CUF: 0.000000 | | | |
| A: 0.862980E−03 | B: 0.626744E−05 | | | |
| C: 0.120331E−04 | D: −.796905E−06 | | | |
| 28: | INFINITY | 0.700000 | | SBSL7_OHARA |
| 29: | INFINITY | 1.000000 | | |
| 30: | INFINITY | 0.500000 | | SBSL7_OHARA |
| 31: | INFINITY | 0.500000 | | |
| IMG: | INFINITY | 0.000000 | | |

Figure 3A:
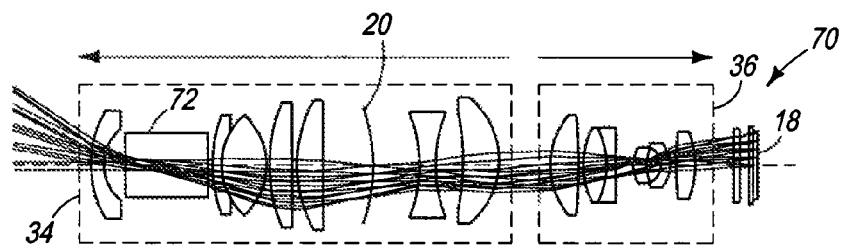
FIGS. 3a-3c illustrates a compound varifocal lens in three focus positions with an intermediate image effected within a moving lens group per an alternate embodiment of the invention.
Figure 3B:
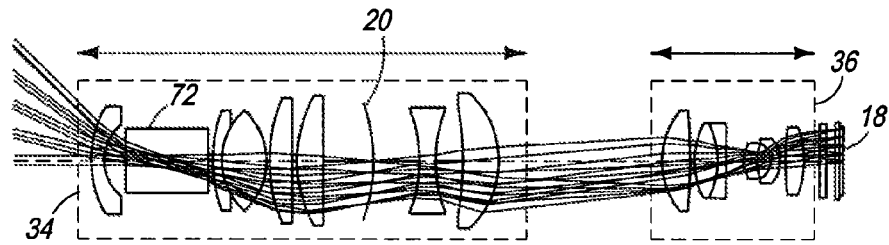
Figure 3C:
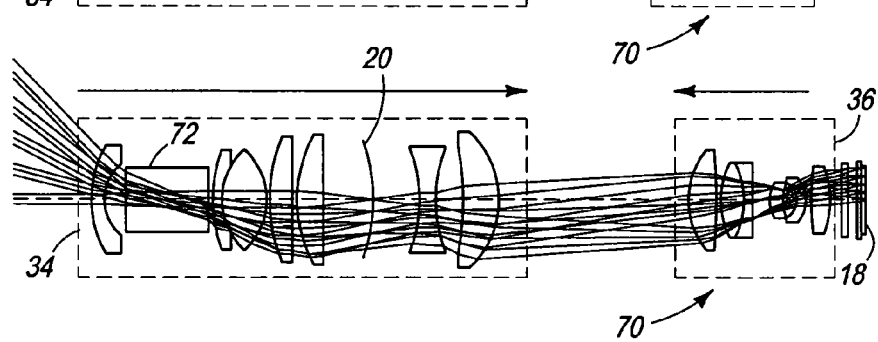

FIGS. 3a-3c illustrate a lens system 70 of similar general structure to that shown schematically in FIG. 1E in three zoom positions. Lens system 70 illustrates a 1.5× varifocal lens with performance as shown in Table 3, with the optical prescription of each of the lens elements shown in Table 4. Lens system 70 comprises a moving group of lenses and an intermediate real image 20 between the object and the final image 18. The first moving lens group 34 contains the intermediate real image 20. A final moving lens group 36, rearward of the first group 34, is also additionally movable to the first group as the entire lens system can be moved as one unit. A fold prism 72 is located in the first moving group 34 to allow the optical path to be folded.

The varifocal lenses can be focused by moving the entire lens or they can be configured to lock the final image in place and allow the front group 34 to move, thereby increasing the moving group count by one. If the front group is moved with the same mechanism used to move the other groups, then these lenses become zoom lenses.

TABLE 3

| Lens Performance (FIGS. 3a-3c) | |
|---|---|
| Zoom | 1.5x |
| Groups | 3, 1 move |
| EFL | 3.4-5.2 mm |
| Image Circle | 7.2 mm |
| F number | 3.0 |
| Field of View | 93.2°-69.7° |
| Distortion | <2% |

TABLE 4

Optical Prescription (FIGS. 3a-3c)

| | RDY | THI | RMD GLA |
|---|---|---|---|
| >OBJ: | INFINITY | 600.000000 | |
| 1: | −260.49084 | 2.000000 | LLAL13_OHARA |
| ASP: | | | |
| K: 0.000000 | | | |
| IC: YES | | CUF: 0.000000 | |
| A: 0.250324E−02 | | B: −.784408E−04 | |
| C: 0.241381E−05 | | D: −.345479E−07 | |
| 2: | 10.34057 | 1.663760 | |
| ASP: | | | |
| K: 5.899479 | | | |
| IC: YES | | CUF: 0.000000 | |
| A: 0.318065E−02 | | B: −.111097E−03 | |
| C: 0.120676E−04 | | D: −.119459E−05 | |
| 3: | INFINITY | 9.000000 | STIH53_OHARA |
| 4: | INFINITY | 0.672493 | |
| 5: | 17.21594 | 1.040373 | STIH4_OHARA |
| 6: | 7.59611 | 4.624505 | SFPL51_OHARA |
| 7: | −7.59611 | 0.515293 | |
| 8: | 19.56185 | 2.477144 | SLAL8_OHARA |
| 9: | −228.72490 | 0.504400 | |
| 10: | 13.44299 | 2.827054 | LLAH53_OHARA |
| ASP: | | | |
| K: −0.351285 | | | |
| IC: YES | | CUF: 0.000000 | |
| A: −.159144E−03 | | B: 0.183781E−05 | |
| C: −.242340E−07 | | D: 0.339042E−09 | |
| 11: | INFINITY | 5.402070 | |
| 12: | INFINITY | 0.000000 | 100000.990000 |
| 13: | INFINITY | 5.270590 | |
| 14: | −13.41927 | 1.500000 | STIM22_OHARA |
| 15: | 12.32409 | 3.118736 | |
| 16: | −44.69275 | 4.075686 | SLAH60_OHARA |
| 17: | −9.89463 | 20.461145 | |
| 18: | 8.51241 | 3.022636 | SLAL8_OHARA |
| 19: | −100.96761 | 0.500000 | |
| 20: | 9.66878 | 2.505078 | SFPL51_OHARA |
| 21: | −9.66878 | 1.045694 | STIH53_OHARA |
| 22: | 25.26628 | 1.000000 | |
| STO: | INFINITY | 1.000000 | |
| 24: | 3.74559 | 1.369335 | STIH53_OHARA |
| 25: | 2.46680 | 1.656541 | |
| 26: | −2.18297 | 1.000000 | STIH53_OHARA |
| 27: | −3.24518 | 0.500000 | |
| 28: | −2794.02915 | 2.247511 | LLAH53_OHARA |
| ASP: | | | |
| K: 0.000000 | | | |
| IC: YES | | CUF: 0.000000 | |
| A: 0.905661E−03 | | B: −.196452E−04 | |
| C: 0.469950E−05 | | D: −.243452E−06 | |
| 29: | −7.40373 | 1.300649 | |
| ASP: | | | |
| K: −1.225778 | | | |
| IC: YES | | CUF: 0.000000 | |
| A: 0.000000E+00 | | B: 0.000000E+00 | |
| C: 0.000000E+00 | | D: 0.000000E+00 | |
| 30: | INFINITY | 0.700000 | SBSL7_OHARA |
| 31: | INFINITY | 1.000000 | |
| 32: | INFINITY | 0.500000 | SBSL7_OHARA |
| 33: | INFINITY | 0.500000 | |
| IMG: | INFINITY | 0.000000 | |

Figure 4A:
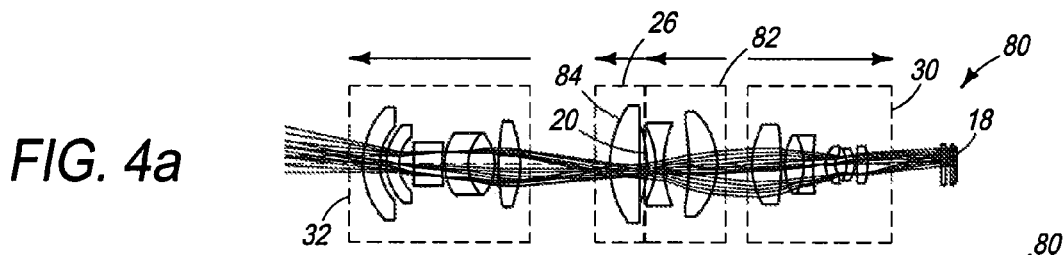
FIGS. 4a-4c illustrates a compound varifocal lens in three focus positions with an intermediate image effected within a moving lens group per yet another embodiment of the invention.
Figure 4B:
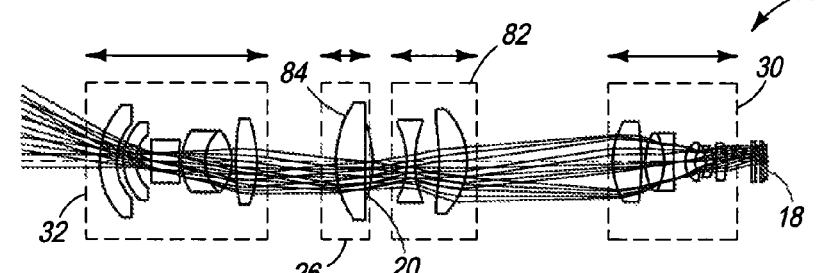
Figure 4C:
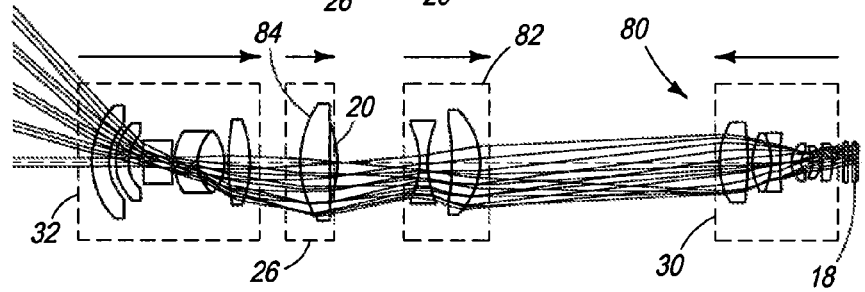

FIGS. 4a-4c illustrate a lens system 80 of similar general structure to that shown schematically in FIG. 1D, but with an additional moving lens group 82, in three zoom positions. Lens system 80 illustrates a 5× varifocal lens with four moving groups, including front moving group 32, intermediate moving group 26, a second intermediate moving group 82, and a rear moving group 30. The intermediate real image 20 exhibits a distorted structure owing to the whole system design concept of the present invention where optical aberrations are allowed in the intermediate image. Accordingly, at least part of the intermediate real image 20 is within moving group 26, comprising a singlet lens 84, during zooming.

Performance of the 5× zoom lens is shown in Table 5, with the optical prescription of each of the lens elements shown in Table 6.

TABLE 5

Lens Performance (FIGS. 4a-4c)

| | |
|---|---|
| Zoom | 5x |
| Groups | 4 move |
| EFL | 2.7-13.5 mm |
| Image Circle | 6 mm |
| F number | 2.0 |
| Field of View | 96°-25° |
| Distortion | <2% |
| Lateral Color | <.01 mm |
| >50% MTF | 70 lp/mm |

TABLE 6

Optical Prescription (FIGS. 4a-4c)

| | RDY | THI | RMD GLA |
|---|---|---|---|
| >OBJ: | INFINITY | 1400.000000 | |
| 1: | 14.07003 | 3.000000 | STIH53_OHARA |
| 2: | 9.20552 | 1.407311 | |
| 3: | 139.63133 | 2.000000 | LLAL13_OHARA |
| ASP: | | | |
| K: 0.000000 | | | |
| IC: YES | | CUF: 0.000000 | |
| A: 0.180871E−02 | | B: −.379204E−04 | |
| C: 0.978093E−06 | | D: −.883183E−08 | |
| 4: | 10.59640 | 2.423059 | |
| ASP: | | | |
| K: 4.095093 | | | |
| IC: YES | | CUF: 0.000000 | |
| A: 0.223689E−02 | | B: −.271386E−04 | |
| C: 0.179148E−05 | | D: −.178184E−06 | |
| 5: | 346.75882 | 5.000000 | SLAH60_OHARA |
| 6: | 15.30348 | 0.500000 | |
| 7: | 9.55962 | 4.000000 | STIH4_OHARA |
| 8: | 6.82758 | 4.689415 | SFPL51_OHARA |
| 9: | −8.90922 | 0.807245 | |
| 10: | 42.01426 | 3.651561 | SLAL8_OHARA |
| 11: | −20.86589 | 8.952950 | |
| 12: | 16.55511 | 5.000000 | LLAH53_OHARA |
| ASP: | | | |
| K: −0.099465 | | | |
| IC: YES | | CUF: 0.000000 | |
| A: −.119734E−03 | | B: 0.225633E−05 | |
| C: −.303880E−07 | | D: 0.153960E−09 | |
| 13: | INFINITY | 15.826803 | |
| 14: | −14.35737 | 1.500000 | STIM22_OHARA |
| 15: | 17.38403 | 4.222659 | |
| 16: | −59.06957 | 4.859917 | SLAH60_OHARA |
| 17: | −13.15643 | 41.909638 | |
| 18: | 13.80672 | 5.000000 | SLAL8_OHARA |
| 19: | −46.32335 | 0.825960 | |
| 20: | 13.09140 | 3.024270 | SFPL51_OHARA |
| 21: | −13.09140 | 1.804414 | STIH53_OHARA |
| 22: | 28.69652 | 1.000000 | |
| STO: | INFINITY | 1.000000 | |
| 24: | 4.18707 | 1.729970 | STIH53_OHARA |
| 25: | 2.77530 | 1.938253 | |
| 26: | −4.86096 | 1.422520 | STIH53_OHARA |
| 27: | −6.12738 | 0.500011 | |
| 28: | 60.78152 | 1.906038 | LLAH53_OHARA |
| ASP: | | | |
| K: 0.000000 | | | |
| IC: YES | | CUF: 0.000000 | |
| A: −.119697E−03 | | B: −.827274E−05 | |
| C: 0.614529E−05 | | D: −.344937E−06 | |
| 29: | −12.75024 | 1.893191 | |
| ASP: | | | |
| K: 5.958613 | | | |
| IC: YES | | CUF: 0.000000 | |
| A: 0.000000E+00 | | B: 0.000000E+00 | |
| C: 0.000000E+00 | | D: 0.000000E+00 | |

TABLE 6-continued

Optical Prescription (FIGS. 4a-4c)

|  | RDY | THI | RMD GLA |
|---|---|---|---|
| 30: | INFINITY | 0.700000 | SBSL7_OHARA |
| 31: | INFINITY | 1.000000 |  |
| 32: | INFINITY | 0.500000 | SBSL7_OHARA |
| 33: | INFINITY | 0.500000 |  |
| IMG: | INFINITY | 0.000000 |  |

Figure 5A:
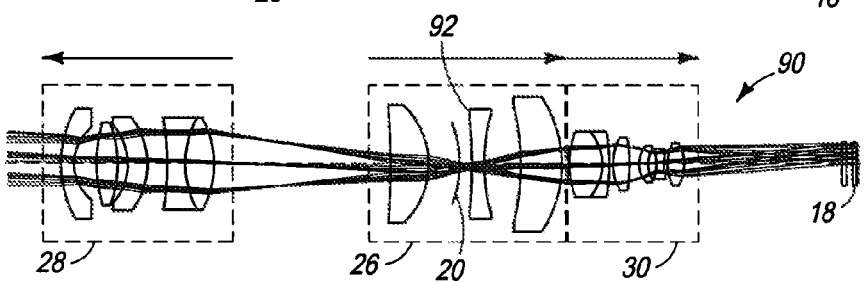
FIGS. 5a-5c illustrates a compound zoom lens in three focus positions with an intermediate image moving from one side of a lens element to another per still another embodiment of the invention.
Figure 5B:
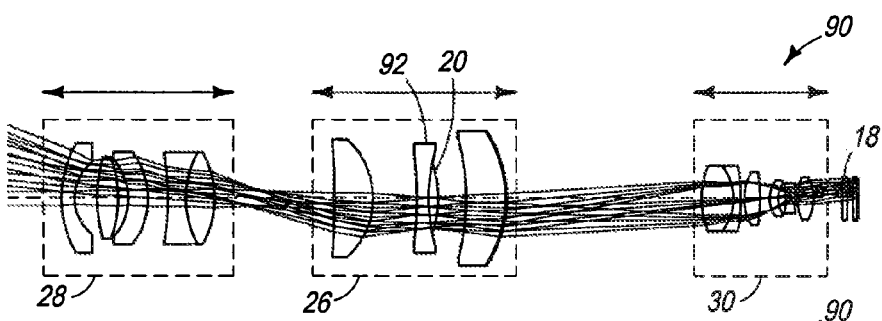
Figure 5C:
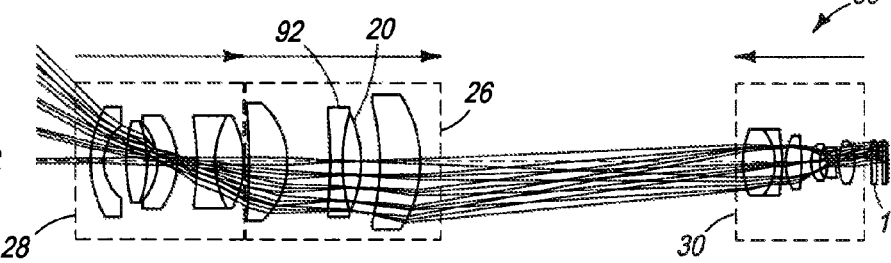

FIGS. 5a-5c illustrate a lens system 90 of similar general structure to that shown schematically in FIG. 1C, but where the intermediate real image 20 moves through a lens element 92 within the intermediate moving lens group 26 as the magnification of the final image 18 is changed. The system 90 is designed as a 15× zoom lens. Lens system 90 includes a stationary front lens group 28, an intermediate moving lens group 26 (including lens element 92 and other singlet lenses 94, 96), and a moving rear lens group 30.

Performance of the 15× zoom lens is shown in Table 7, with the optical prescription of each of the lens elements shown in Table 8.

TABLE 7

Lens Performance (FIGS. 2a-2c)

| Zoom | 15x |
|---|---|
| Groups | 3, 2 move |
| EFL | 2.9-42 mm |
| Image Circle | 6 mm |
| F number | 3.5 |
| Field of View | 92°-7.8° |
| Distortion | <1% |
| Lateral Color | <.01 mm |
| >50% MTF | 60 lp/mm |

TABLE 8

Optical Prescription (FIGS. 5a-5c)

|  | RDY | THI | RMD GLA |
|---|---|---|---|
| >OBJ: | INFINITY | 1400.000000 |  |
| 1: | 16.87758 | 2.000000 | SLAH60_OHARA |
| 2: | 7.16821 | 2.910261 |  |
| 3: | 23.69598 | 2.971174 | STIH10_OHARA |
| 4: | −23.91718 | 1.625796 |  |
| 5: | −9.27996 | 3.265211 | STIH6_OHARA |
| 6: | −9.91002 | 2.379631 |  |
| 7: | −36.73544 | 3.000000 | STIM35_OHARA |
| 8: | 13.58046 | 3.746610 | SFPL51_OHARA |
| 9: | −10.50476 | 0.500000 |  |
| 10: | −41.26535 | 5.672691 | LLAH53_OHARA |
| ASP: |  |  |  |
| K: | −130.643869 |  |  |
| IC: | YES | CUF: 0.000000 |  |
| A: | −.352862E−04 | B: 0.354094E−05 |  |
| C: | −.542721E−07 | D: 0.334914E−09 |  |
| 11: | −8.12073 | 5.789277 |  |
| ASP: |  |  |  |
| K: | −0.833502 |  |  |
| IC: | YES | CUF: 0.000000 |  |
| A: | 0.181968E−03 | B: 0.000000E+00 |  |
| C: | 0.000000E+00 | D: 0.000000E+00 |  |
| 12: | −55.16899 | 2.000000 | SBSL7_OHARA |
| 13: | 56.48198 | 5.222600 |  |
| 14: | −44.84376 | 6.000000 | SLAH60_OHARA |
| 15: | −17.83269 | 49.474826 |  |
| 16: | 10.94757 | 5.160549 | SFPL51_OHARA |
| 17: | −6.76064 | 1.000000 | SLAH60_OHARA |
| 18: | −32.82385 | 0.500000 |  |
| 19: | 7.65325 | 2.216490 | SLAH66_OHARA |
| 20: | −35.25759 | 1.000000 |  |
| STO: | INFINITY | 0.500000 |  |
| 22: | 3.38080 | 1.000000 | STIH6_OHARA |
| 23: | 2.51532 | 1.421441 |  |
| 24: | −3.63901 | 1.003159 | STIH53_OHARA |
| 25: | 6.32264 | 0.570596 |  |
| 26: | 9.73140 | 2.412720 | LLAH53_OHARA |
| ASP: |  |  |  |
| K: | −11.526595 |  |  |
| IC: | YES | CUF: 0.000000 |  |

TABLE 8-continued

Optical Prescription (FIGS. 5a-5c)

|  | RDY | THI | RMD GLA |
|---|---|---|---|
|  | A: 0.191930E−03 | B: 0.000000E+00 |  |
|  | C: 0.000000E+00 | D: 0.000000E+00 |  |
| 27: | −5.52474 | 1.865620 |  |
|  | ASP: |  |  |
|  | K: 0.010552 |  |  |
|  | IC: YES | CUF: 0.000000 |  |
|  | A: 0.183875E−03 | B: 0.000000E+00 |  |
|  | C: 0.000000E+00 | D: 0.000000E+00 |  |
| 28: | INFINITY | 0.700000 | SBSL7_OHARA |
| 29: | INFINITY | 1.000000 |  |
| 30: | INFINITY | 0.500000 | SBSL7_OHARA |
| 31: | INFINITY | 0.500000 |  |
| IMG: | INFINITY | 0.000000 |  |

Figure 6A:
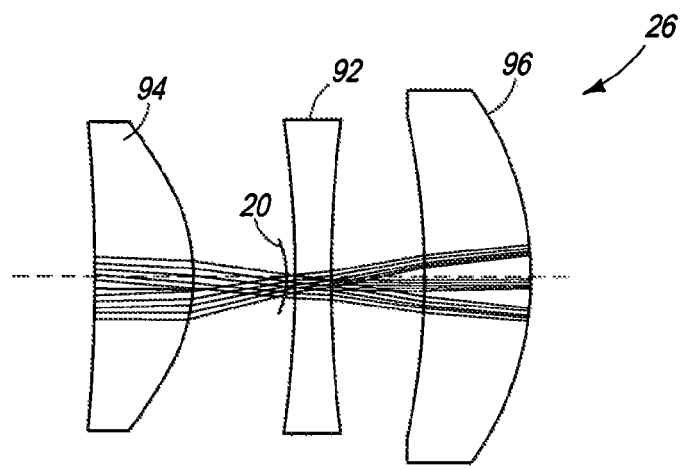
FIGS. 6a-6c illustrate a magnified portion of the intermediate lens group of FIGS. 5A-5C with ray crossings showing the curved plane of the intermediate image.
Figure 6B:
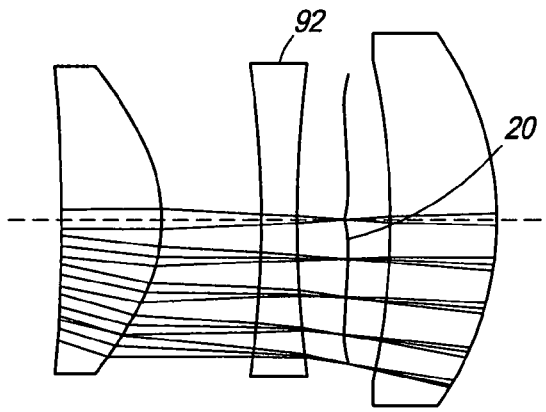
Figure 6C:
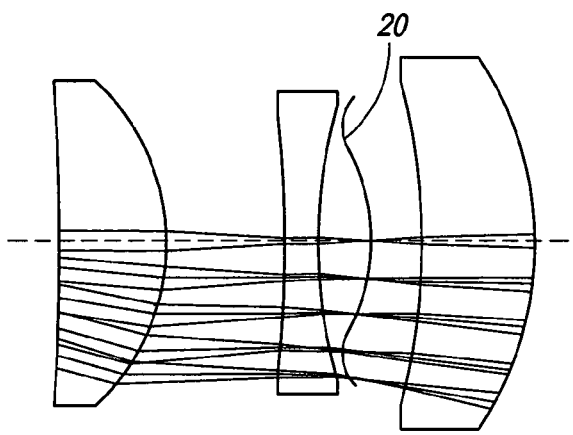

Field Curvature at Intermediate Image:

A close up view of the intermediate image is shown in FIGS. 6a-6c. In the figures, the intermediate image is shown by the convergence of rays for each field point. Notice that the plane of convergence for all field points is not a flat plane but a curved surface. The curved surface is generally aspherical in shape.

Figure 7A:
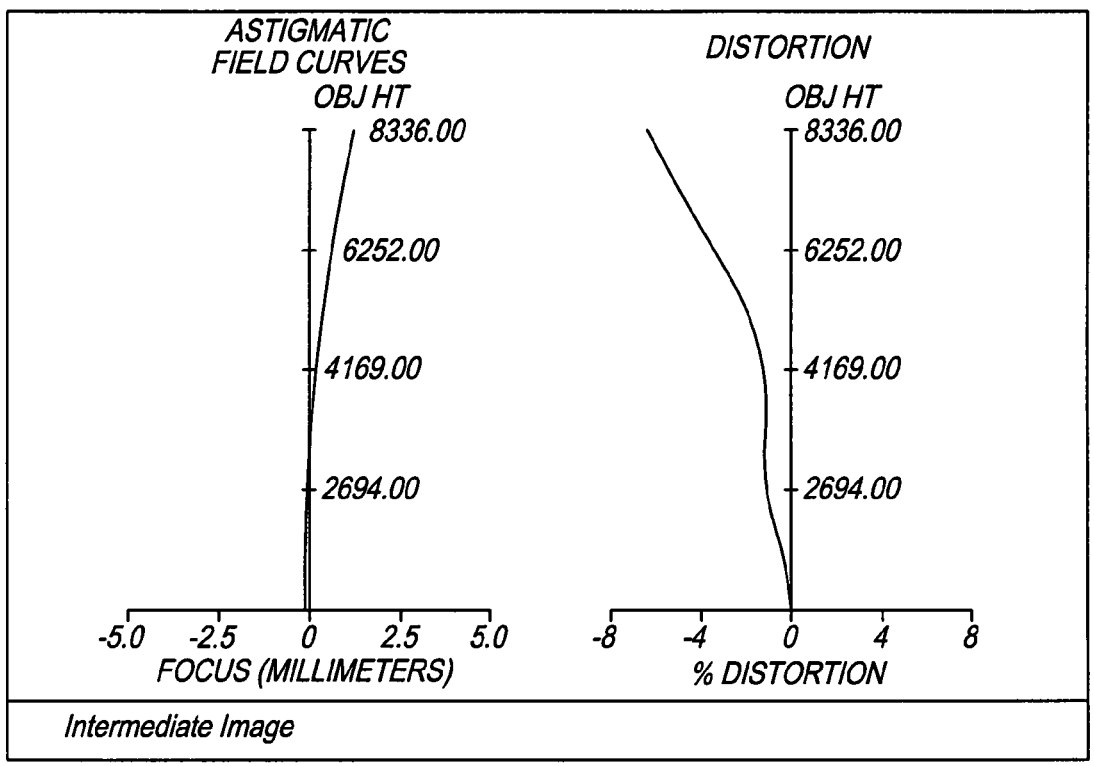
FIGS. 7-9 are plots showing exemplary changes in focus, distortion, lateral color, and MTF between intermediate images and final images in the lens systems implemented according to the present invention.
Figure 7B:
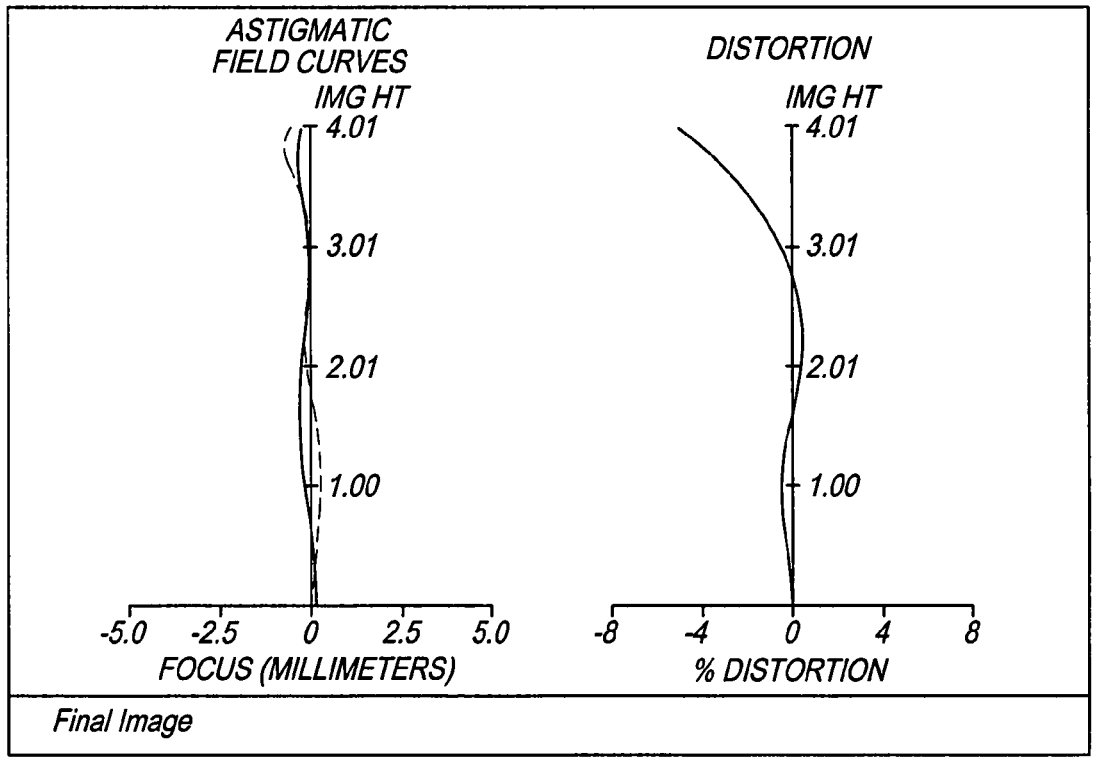

The field curvature at the intermediate image is also shown in the astigmatic field curves of FIG. 7a. The field curvature of the final image is show in FIG. 7b.

The intermediate field curvature is allowed to extend to any amount and is not constrained to a flat plane.

Distortion at Intermediate Image:

FIG. 7a shows the distortion at the intermediate image. The intermediate distortion is not constrained and is greater than the distortion at the final image, shown in FIG. 7b. In practice the intermediate distortion ranges from 5% barrel distortion to 100% or more barrel distortion while the final image distortion is less than the distortion of the intermediate image.

Figure 8A:
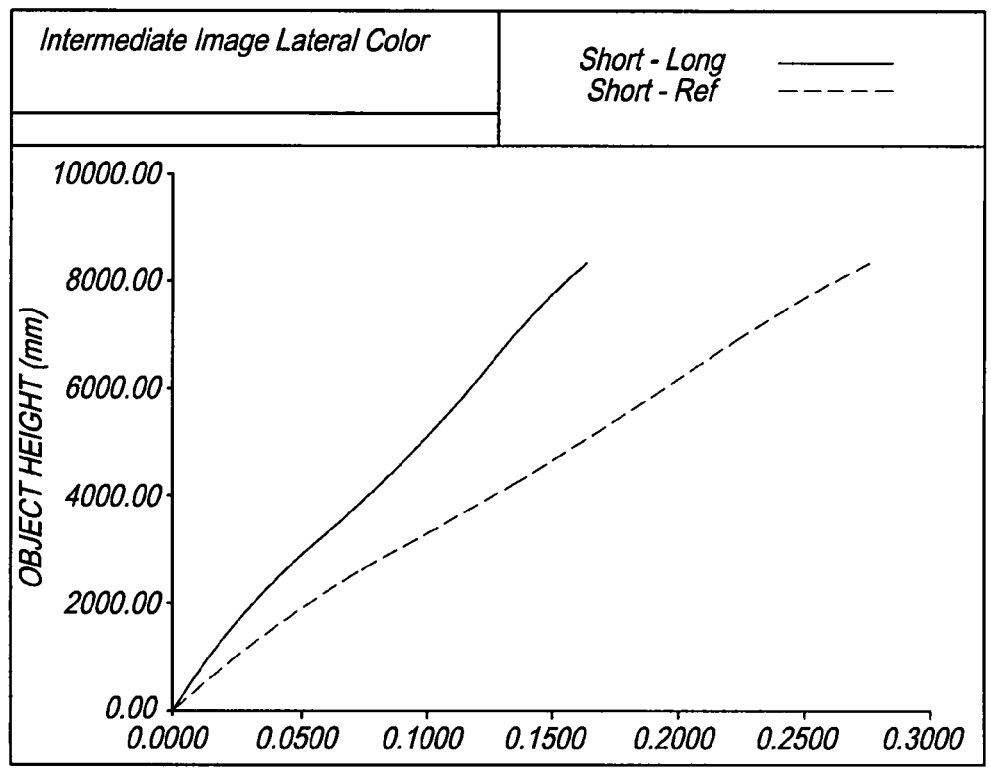
Figure 8B:
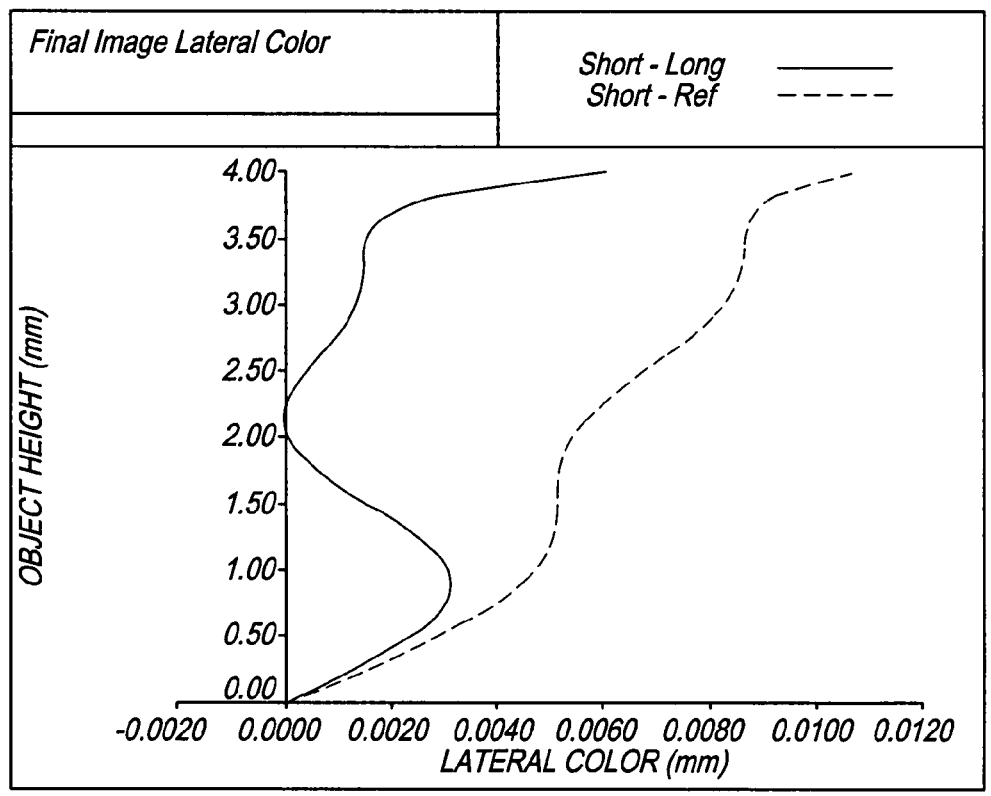

Lateral Color at Intermediate Image:

The color separation, lateral color, at the intermediate image is allowed to be very large and undercorrected compared to the final image. FIG. 8a shows twenty-five times more lateral color at the intermediate image than FIG. 8b at the final image. In practice, the lateral color of the intermediate image can be greater than five times that of the final image and sometimes even greater than 100 times. By allowing the intermediate image to have poor color correction the designer can use fewer color correcting lens elements in the system thereby reduce lens element count and cost. Color correcting lens elements are positioned between the object and the intermediate image and between the intermediate image and the final image. These lens elements all work together to give acceptable color correction at the final image.

The ray aberration plots would also show the difference in the color correction of the intermediate image and the final image. For the intermediate image the colors are shown to be very separated.

Figure 9A:
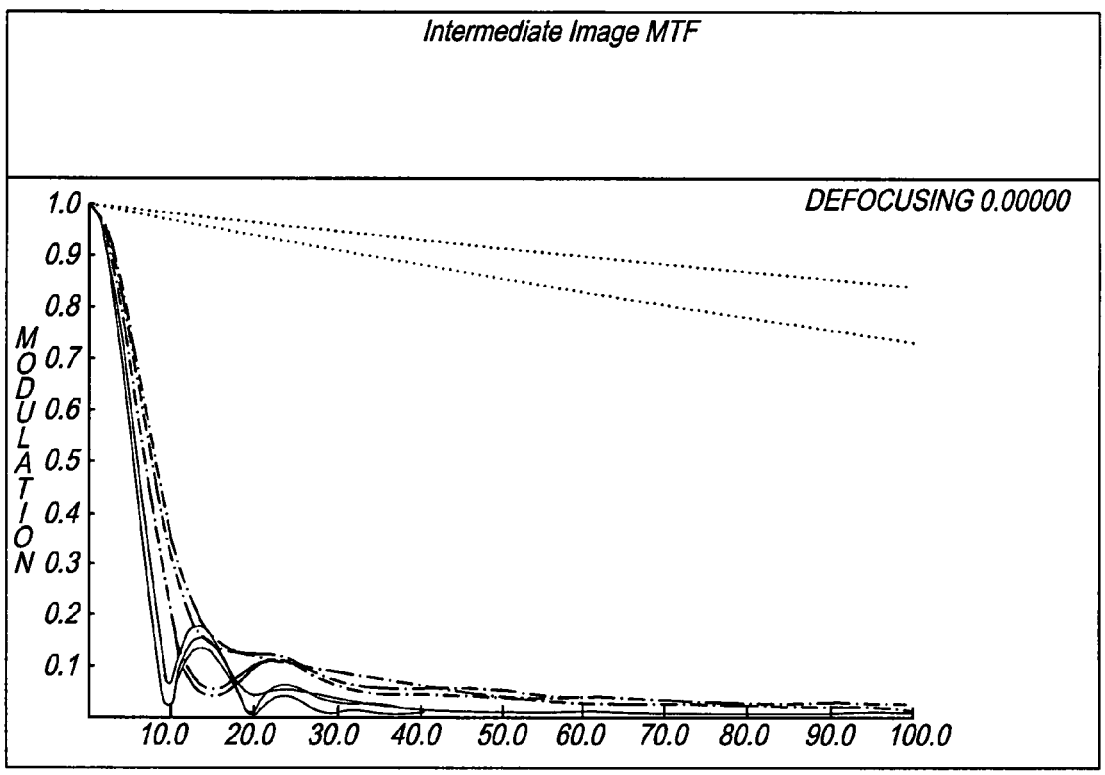
Figure 9B:
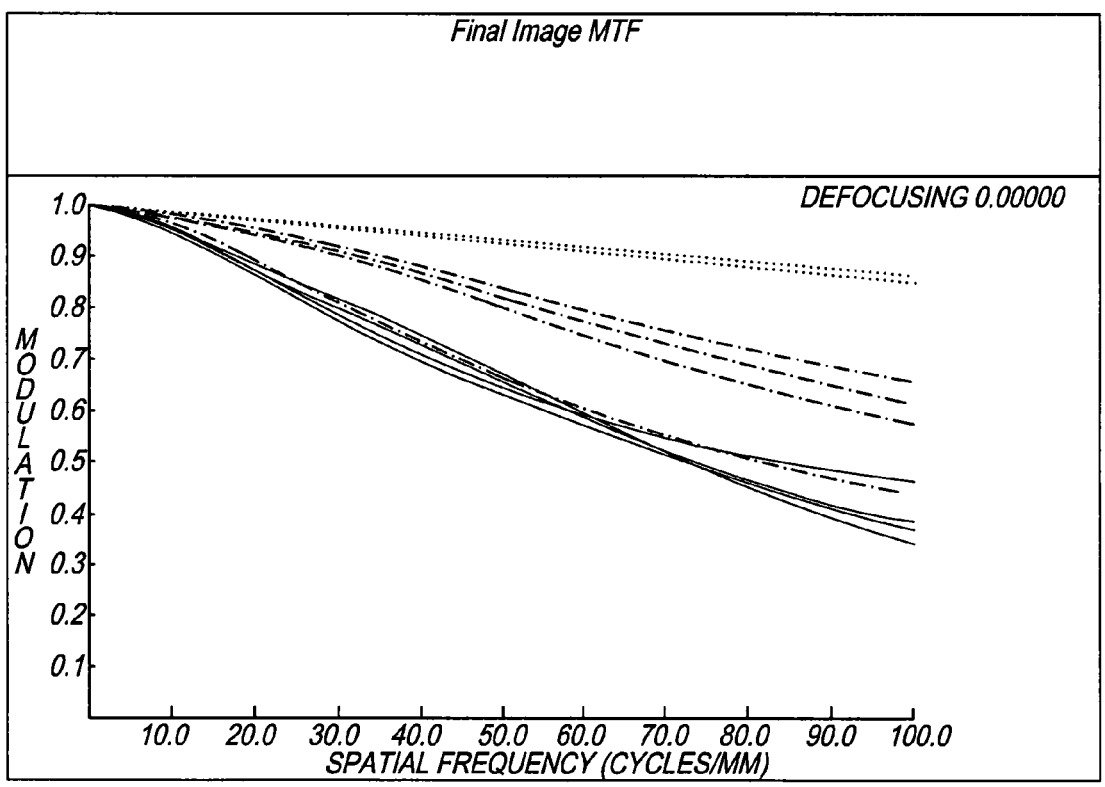

Focus at Intermediate Image:

Focus at the intermediate image is not constrained and the MTF (modular transfer function, a measure of lens sharpness) performance is very low compared to the MTF of the final image. Inspection of FIGS. 6a-6c shows that the convergence of rays for each field point is poor. FIG. 9a shows that the MTF of the intermediate is about $\frac{1}{10}^{th}$ of the final MTF shown in FIG. 9b. Allowing the intermediate image to have very poor focus performance requires fewer lens elements between the object and the intermediate image and fewer elements between the intermediate image and the final image, thereby reducing cost and complexity. Since the system is designed as a complete system, no one or two groups are required to correct all aberrations and produce good imaging qualities. Instead, all lenses work together to achieve good performance in the final image.

Thermal Correction at Intermediate Image:

Thermal correction is spread out across all lens elements on both sides of the intermediate image to result in a thermally corrected lens system. Thermally compensating glass types and lens shapes are chosen and positioned both before and after the intermediate image to thermally compensate the system from e.g. −20° C. to +70° C. The lenses described herein show a poor thermal performance of the intermediate image at −20° C., but a good performance of the entire system at −20° C. Likewise, lenses described herein show a poor thermal performance of the intermediate image at +70° C., but a good performance of the entire system at +70° C.

Vignetting and Stop Position:

This lens type potentially has two stop positions; one between the object and the intermediate image, the front stop, and another between the intermediate image and the final image, the rear stop. Generally the best vignetting result occurs when the system optical stop is positioned at the rear stop. This position allows the front stop to be non-constrained. At the front stop the chief rays for each field point are not constrained to be in the same z position along the axis of the optical system. They are allowed to vary in z position and height above or below the optical axis. Also the volume of space used by each field at the front stop is allowed to vary. The volume for each field at the front stop increases with increasing field. The increasing volume for the edge field points avoids the cosine squared vignetting that usually occurs at a defined stop with large incident angles such as is typically found in wide angle lenses. The edge field points do not have such large angles at the rear stop so they are less affected by the cosine squared rule. In this way vignetting performance is improved above what is normally available to rectilinear lenses and results in better overall transmission of light through the lens.

Iris Position and Stop Position:

Since there are two optical stop positions available, the lens iris, or mechanical stop, can be positioned at either or both stop positions. Since the front stop varies in position and size, it is often best to put the iris at the rear stop position. However, sometimes a mechanical constraint or some other consideration requires the iris to be positioned at the front stop. To maintain some of the vignetting advantages listed above, the optical stop is still positioned at the rear stop but the iris is positioned at the front stop. The designer can then control the edge rays at the front stop without controlling the chief rays at the front stop. This allows less vignetting of the edge field points, better transmission, and the flexibility to position the iris at the front stop. In one embodiment, the transmission of the edge field point is 57% due to the unconstrained front stop. When the front stop is constrained the transmission falls to 45%.

Other Lens Examples

1. A 3× varifocal lens that is foldable with a prism in the front group. There is one internal moving group between the object and the intermediate image.

| | |
|---|---|
| Zoom | 3x |
| Groups | 4, 1 move |
| EFL | 3.4-17 mm |
| Image Circle | 7.2 mm |
| F number | 3.0 |
| Field of View | 69.6°-23.6° |
| Distortion | <2% |

2. A 7× varifocal lens with 2 moving groups. The first moving group contains lens elements that are on both the object and final image side of the intermediate image. The rear group is the second moving group.

| | |
|---|---|
| Zoom | 7x |
| Groups | 3, 2 move |
| EFL | 2.2-15.4 mm |
| Image Circle | 6.2 mm |
| F number | 2.8 |
| Field of View | 111.7°-23.5° |
| Distortion | <5% |
| Lateral Color | <.01 mm |
| >50% MTF | 80 lp/mm |

3. A 15× varifocal lens with 2 moving groups. The first moving group contains lens elements that are on both the object and final image side of the intermediate image. One element in this group moves through the intermediate image. The rear group is the second moving group.

| | |
|---|---|
| Zoom | 15x |
| Groups | 3, 2 move |
| EFL | 2.75-40.2 mm |
| Image Circle | 6 mm |
| F number | 3.5 |
| Field of View | 94.5°-8.25° |
| Distortion | <1% |
| Lateral Color | <.01 mm |
| >50% MTF | 50 lp/mm |

4. A 9× varifocal lens with 2 moving groups. Both moving groups are after the intermediate image.

| | |
|---|---|
| Zoom | 9x |
| Groups | 3, 2 move |
| EFL | 2.4-21.5 mm |
| Image Circle | 6 mm |
| F number | 3.25 |
| Field of View | 104.8°-15.7° |
| Distortion | <5% |
| Lateral Color | <.01 mm |
| >50% MTF | 80 lp/mm |

5. A 5× varifocal lens with 2 moving groups. Both moving groups are after the intermediate image.

| | |
|---|---|
| Zoom | 5x |
| Groups | 3, 2 move |
| EFL | 2.0-10 mm |
| Image Circle | 6 mm |
| F number | 3.0 |
| Field of View | 112.5°-33.2° |
| Distortion | <1% |
| Lateral Color | <.01 mm |
| >50% MTF | 80 lp/mm |

6. A 5× varifocal that is foldable with a prism in the front group. Both of the 2 moving groups are after the intermediate image. A folded version of the 5× varifocal of is possible through the prism. The lens system has no moving subgroups in the front group between the object and the intermediate real image. The magnification of the front group does not change as the lens system is zoomed. The rear group does change magnification.

| | |
|---|---|
| Zoom | 5x |
| Groups | 3, 2 move |
| EFL | 3.4-17 mm |
| Image Circle | 7.2 mm |
| F number | 3.0 |
| Field of View | 93.2°-23.6° |
| Distortion | <2% |

In another version, the separate magnification of the front group and the separate magnification of the rear group do not change as the lens is zoomed. The total system magnification does change as the front and rear groups are moved.

Zoom lens systems can then be designed with a first lens group between the object and the intermediate real image with no moving subgroups wherein the focal length of the first lens group is not changed as the first lens group is moved. Furthermore, a second lens group is included between the intermediate real image and the final image with moving subgroups wherein the focal length of the second lens group is changed as the subgroups of the second lens group are moved. In an alternate embodiment, the two groups are flipped so that the first lens group has moving subgroups and the second has none. Furthermore, the moving subgroups can be exchanged for non-moving ones so that the focal length of each lens group is not changed as the group as a whole is moved.

7. A 5× zoom lens that is foldable with a front prism. It has two moving groups. In order; there is a fixed front group, a moving group, a fixed negative-positive field lens group, and a moving rear group. A folded configuration is possible using the same 5× zoom lens with the prism.

| | |
|---|---|
| Zoom | 5x |
| Groups | 4, 2 move |
| EFL | 3.4-17 mm |
| Image Circle | 7.2 mm |
| F number | 3.4 |
| Field of View | 93.1°-23.6° |
| Distortion | <0.5% |
| Lateral Color | <.01 mm |
| >50% MTF | 80 lp/mm |

8. A front foldable zoom lens with two moving groups and the optical stop located in the front position. The diameter of the front stop must increase as the lens is zoomed from a wide angle to a lesser angle.

| | |
|---|---|
| Zoom | 2.5x |
| Groups | 4, 2 move |
| EFL | 5.4-13.5 mm |
| Image Circle | 9.47 mm |
| F number | 3.4 |
| Field of View | 84°-38.4° |
| Distortion | <2% |
| Lateral Color | <.01 mm |
| >50% MTF | 70 lp/mm |

9. A 15× zoom lens with 3 moving groups: a fixed front group, a moving group, a moving field lens group and a moving rear group.

| | |
|---|---|
| Zoom | 15x |
| Groups | 4, 3 move |
| EFL | 2.5-36.3 mm |
| Image Circle | 6 mm |
| F number | 3.6 |
| Field of View | 100.4°-9.2° |
| Distortion | <1% |
| Lateral Color | <.01 mm |
| >50% MTF | 70 lp/mm |

10. A 10× zoom lens with 2 moving groups: a fixed front group, a moving field lens group and a moving rear group. The intermediate image is contained within the moving field lens group.

| | |
|---|---|
| Zoom | 10x |
| Groups | 3, 2 move |
| EFL | 2.5-24.5 mm |
| Image Circle | 6 mm |
| F number | 3.5 |
| Field of View | 100.3°-14° |
| Distortion | <2% |
| Lateral Color | <.01 mm |
| >50% MTF | 80 lp/mm |

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A lens system for forming a magnified final image of an object, said system having an object side and an image side and forming an intermediate real image between the object and final image, said lens system being configured to move the intermediate real image along an optical axis with respect to the final image when a magnification of the final image is changed, and further comprising a moving lens group containing the intermediate real image as the magnification of the final image is changed.

2. The lens system of claim 1, the system comprising:
   a front lens group including at least two lens elements and located between the object and the intermediate real image;
   a rear lens group including at least two lens elements and located between the intermediate real image and the final image; and
   an intermediate lens group, moveable along an optical axis between the front and rear lens group, containing the intermediate real image as the magnification of the final image is changed.

3. The lens system of claim 2, wherein the rear lens group is moveable along the optical axis to change the magnification of the final image.

4. The lens system of claim 3, wherein the front lens group is moveable along the optical axis to change the magnification of the final image.

5. The lens system of claim 2, wherein the front lens group is moveable along the optical axis to change the magnification of the final image.

6. The lens system of claim 1, the system comprising:
   a first moveable lens group containing the real intermediate real image;
   a second moveable lens group, along an optical axis between the intermediate real image and the final image, within and additionally moveable from the first moveable lens group.

7. The lens system of claim 6, the system comprising a third moveable lens group, separate from the second moveable lens group, and within and additionally moveable from the first moveable lens group.

8. The lens system of claim 7, the system comprising a fourth moveable lens group, separate from the second and third moveable lens groups, and within and additionally moveable from the first moveable lens group.

9. The lens system of claim 1, wherein the lens system is configured so that optical aberrations at the intermediate real image, including field curvature, focus, astigmatism, distortion and color separation, are of greater magnitude than the corresponding optical aberrations of the final image.

10. The lens system of claim 1, wherein the lens system is a varifocal lens system.

11. The lens system of claim 1, the system comprising a lens element within a moving lens group that moves through the intermediate real image as the magnification of the final image is changed.

12. The lens system of claim 1, wherein the lens system is a zoom lens system, the lens system comprising:
   a negative front group;
   a positive zoom group, the intermediate image between the positive zoom group and the final image;
   a moving intermediate lens group; and
   a positive rear zoom group.

13. The lens system of claim 1, further including a prism to fold a system optical path of the lens system.

14. The lens system of claim 1, further including a prism to fold a system optical path of the lens system.

15. A zoom lens system having an object side and an image side and forming an intermediate real image between the object and a magnified final image, the lens system comprising:
- a moving lens group containing the intermediate real image as the magnification of the final image is changed;
- a first lens group with moving subgroups configured to effect a focal length change of the first lens group as the moving subgroups are moved; and
- a second lens group configured to not change a focal length of the second lens group as the second lens group is moved.

16. The zoom lens system of claim 15, wherein the first lens group is located between the object and the intermediate real image and the second lens group is located between the intermediate real image and the final image.

17. The zoom lens system of claim 15, wherein the first lens group is located between the intermediate real image and the final image and the second lens group is located between the object and the intermediate real image.

18. The lens system of claim 15, further including a prism to fold a system optical path of the lens system.

19. A zoom lens system having an object side and an image side and forming an intermediate real image between the object and a magnified final image, the lens system comprising:
- a moving lens group containing the intermediate real image as the magnification of the final image is changed;
- a first lens group, located between the object and the intermediate real image, configured to not change a focal length of the first lens group as the first lens group is moved; and
- a second lens group, located between the intermediate real image and the final image, configured to not change a focal length of the second lens group as the second lens group is moved.

* * * * *